US011866979B2

(12) United States Patent
Trautmann et al.

(10) Patent No.: US 11,866,979 B2
(45) Date of Patent: Jan. 9, 2024

(54) WINDOW LIFT SYSTEM AND MOTOR VEHICLE DOOR

(71) Applicant: Brose Fahrzeugteile SE & Co. Kommanditgesellschaft, Bamberg, Bamberg (DE)

(72) Inventors: Michael Trautmann, Neudrossenfeld (DE); Norman Hümmer, Ebensfeld (DE); Michael Jahn, Baunach (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 120 days.

(21) Appl. No.: 17/333,813

(22) PCT Filed: Nov. 29, 2019

(86) PCT No.: PCT/EP2019/083064

§ 371 (c)(1),
(2) Date: May 28, 2021

(87) PCT Pub. No.: WO2020/109539

PCT Pub. Date: Jun. 4, 2020

(65) Prior Publication Data

US 2022/0090430 A1 Mar. 24, 2022

(30) Foreign Application Priority Data

Nov. 30, 2018 (DE) ..................... 10 2018 220 656.2

(51) Int. Cl.
*E05F 11/48* (2006.01)
*E05F 15/689* (2015.01)

(52) U.S. Cl.
CPC .......... *E05F 11/488* (2013.01); *E05F 15/689* (2015.01); *E05Y 2201/224* (2013.01); *E05Y 2201/684* (2013.01); *E05Y 2900/55* (2013.01)

(58) Field of Classification Search
CPC ..... E05F 11/488; E05F 11/483; E05F 15/689; E05Y 2201/224; E05Y 2201/684; E05Y 2900/55
(Continued)

(56) References Cited

U.S. PATENT DOCUMENTS 5,694,717 A * 12/1997 Gier ..................... E05F 11/481 49/352
6,546,672 B2 4/2003 Tatsumi et al.
(Continued)

FOREIGN PATENT DOCUMENTS

DE 202008016221 U1 4/2010
DE 102009033466 A1 1/2011
(Continued)

OTHER PUBLICATIONS

International Search Report for PCT/EP2019/083064, dated Mar. 2, 2020, 2 pages.

*Primary Examiner* — Jerry E Redman
(74) *Attorney, Agent, or Firm* — Dickinson Wright PLLC

(57) ABSTRACT

A window lift system including a first guide rail including a first stop, a second guide rail which has a second stop in an upper end region, a first slider guided on the first guide rail, a second slider guided on the second guide rail, cable drum, and a drive cable driven by means of the cable drum and coupled to the sliders and extending through a Bowden cable sheath between the upper end region of the second guide rail and a lower end region of the first guide rail. The sliders are movable by the drive cable along the guide rails into a stop position in which the second slider lies against the second stop and the first slider is spaced apart from the first stop by a predefined distance ranging between 0.4 percent and 1.2 percent of the length of the Bowden cable sheath.

18 Claims, 3 Drawing Sheets

(58) Field of Classification Search
USPC .......................................................... 49/352
See application file for complete search history.

(56) References Cited

U.S. PATENT DOCUMENTS

| | | | | |
|---|---|---|---|---|
| 2003/0233791 A1* | 12/2003 | Benoit | E05F 11/488 49/352 |
| 2015/0275560 A1* | 10/2015 | Yamamoto | E05F 11/485 29/434 |
| 2015/0352927 A1* | 12/2015 | Kriese | E05F 11/385 49/459 |
| 2016/0047411 A1* | 2/2016 | Simonneau | E05F 15/695 74/502.5 |

FOREIGN PATENT DOCUMENTS

| | | | |
|---|---|---|---|
| EP | 1778942 | B1 | 3/2009 |
| EP | 2050909 | A2 | 4/2009 |
| JP | 2002147110 | A | 5/2002 |
| JP | 2008208555 | A | 9/2008 |
| JP | 2018071235 | A | 5/2018 |

* cited by examiner

WINDOW LIFT SYSTEM AND MOTOR VEHICLE DOOR

CROSS-REFERENCE TO RELATED APPLICATIONS

This application is the U.S. National Phase of PCT Application No. PCT/EP2019/083064 filed on Nov. 29, 2019, which claims priority to German Patent Application No. DE 10 2018 220 656.2, filed on Nov. 30, 2018, the disclosures of which are hereby incorporated in their entirety by reference herein.

TECHNICAL FIELD

The present disclosure relates to a window regulator system and a motor vehicle door.

BACKGROUND

Window regulator systems for vehicles are used to move a window pane which is guided in a vehicle door. For this purpose, it is commonly the case that two parallel guide rails are provided, on which there is guided in each case one driver which is movable by means of a cable drive, wherein the window pane is coupled to the driver.

In motor vehicles, driver or front passenger doors are typically arranged between a so-called A pillar and a so-called B pillar of the vehicle. A window opening of the door is in this case normally delimited by an inclined front strut located on the A pillar and a rear strut located on the B pillar. The window pane is movable by means of a window regulator system between a closed position, in which the pane covers the window opening, and an open position, in which the pane at least partially opens up the window opening. It is commonly the case that the window pane is guided along the rear strut between sealing lips or the like over the entire movement path between the open and the closed position, whereas the window pane is guided on the front strut only over a small part of the movement path owing to the inclination of said front strut. The friction forces acting on the window pane are therefore greater in the region of the rear strut.

SUMMARY

The present disclosure may be based on one or more objects such as providing an improved window regulator concept for a motor vehicle.

According to one or more embodiments, a window regulator system for a motor vehicle is provided. The window regulator system may include a first guide rail which has a first stop in an upper end region, a second guide rail which has a second stop in an upper end region, a first slider guided on the first guide rail, a second slider guided on the second guide rail, a cable drum, and a drive cable which can be driven by means of the cable drum and which is coupled to the sliders and which is guided between the upper end region of the second guide rail and a lower end region of the first guide rail in a Bowden cable sheath. The sliders are movable by the drive cable along the guide rails into a stop position, in which the second slider lies against the second stop and the first slider is positioned or spaced apart by a predetermined distance from the first stop. The predetermined distance may have a range between 0.4 percent and 1.2 percent of a length of the Bowden cable sheath.

According to another embodiment, a motor vehicle door is provided. The motor vehicle door has a frame which defines a window opening, and the window opening may be delimited in relation to a door longitudinal direction by a first strut and by a second strut arranged at a distance from said first strut. Furthermore, the motor vehicle door may include a window regulator system according to the embodiments described herein. The first rail may be, in relation to the door longitudinal direction, arranged in the region of the first strut and the second guide rail is arranged in the region of the second strut. The motor vehicle door furthermore has a window pane which is coupled to the sliders of the window regulator system and which has a rear edge guided along the second strut and has a front edge running obliquely with respect to the rear edge. The window pane is movable by means of the sliders into a closed position in which the window pane covers the window opening, wherein, in the closed position of the window pane, the sliders are arranged in the stop position.

As an example only one of two sliders, which may be guided on parallel guide rails, of the window regulator system move against a stop when the window pane that is movable by means of the sliders is moved into a closed position. As an example, the cable length of a cable section of the drive cable to which the first slider, which in the stop position of the sliders is intended to be arranged at a distance from the respective stop, can be configured accordingly. According to the one or more embodiments, the predetermined distance at which the first slider is arranged in relation to the first stop in the stop position be in a range between 0.4 percent and 1.2 percent of a length of the Bowden cable sheath in which the drive cable is guided between the guide rails. It has surprisingly been shown that, in this distance range, even in the case of very long Bowden cable sheaths, for example in the case of Bowden cable sheaths with a length between 700 mm and 800 mm, reliable movement of the window pane into its closed position is achieved, specifically irrespective of the external conditions such as temperature, humidity and the like.

In one or more embodiments, arranging the first rail with the first slider, which in the stop position, as described, is arranged at a distance from the first stop, in the region of a front, inclined strut of a door. As an example, by means of the cable drive or the cable drum, a pulling force can be applied directly to the first slider via a first cable section, and, by means of a second cable section, which is partially guided in the Bowden cable sheath, the pulling force applied to the first slider is transmitted to the second slider such that both sliders are moved along the same direction. Since the window pane is guided at the rear edge in the region of the second strut, a greater force has to be overcome by the second slider than by the first slider. Therefore it may be advantageous for the first slider, in the stop position, to be positioned at the abovementioned distance from the stop, as this ensures that force can still always be transmitted to the second slider even in the event of sagging of the Bowden cable sheath.

According to one or more embodiments, the predetermined distance is greater than 3 mm and less than or equal to 8 mm. In this range, such as for Bowden cable sheaths with a length in a range from 700 mm to 800 mm, a reliable reserve for instances of sagging or changes in length of the Bowden cable sheath is provided.

According to another embodiment, the predetermined distance is greater than 3 mm and less than or equal to 6 mm. This distance may provide a number of advantages such as despite a sufficiently large reserve for instances of sagging or changes in length of the Bowden cable sheath, tilting of the window pane owing to the different positions of the sliders with respect to the longitudinal extent of the guide rails is kept small.

As an example, the first stop is formed as a single piece with the first guide rail.

As another example, the second stop is formed as a single piece with the second guide rail.

The single-piece form of the stop with the respective guide rail offers the advantage that the number of individual parts of the window regulator system is reduced. This facilitates, for example, the assembly of the system.

According to one or more embodiments, a first cable section of the drive cable is coupled to the first slider, is guided via an upper first cable deflector, which is arranged in the upper end region of the first guide rail, to the cable drum and from this via a lower second cable deflector, which is arranged in a lower end region of the second guide rail, to the second slider, and is coupled to the second slider. A second cable section of the drive cable is coupled to the second slider, is guided via an upper second cable deflector, which is arranged in the upper end region of the second guide rail, and via a lower first cable deflector, which is arranged in the lower end region of the first guide rail, to the first slider, and is coupled to the first slider. In this way, it is achieved that the pulling force applied by the cable drum to the first cable section is transmitted in an efficient manner via the first slider to the second slider.

One or more of the cable deflectors may be deflecting pulleys. This may reduce cable friction at the deflection points.

According to one embodiment of the door, the window pane, at the rear edge, is guided by a guide structure along the second strut. The guide structure may for example be formed by mutually oppositely situated lips which define a guide slot into which the rear edge of the pane is inserted. The pane may lie against both lips.

The guide structure preferably extends parallel to the second guide rail.

The above configurations and refinements may be combined with one another as desired where sensible. Further possible configurations, refinements and implementations of the invention also encompass combinations—not explicitly mentioned—of features of the invention described above or below with regard to the exemplary embodiments. In particular, here, a person skilled in the art will also add individual aspects as improvements or additions to the respective basic form of the present invention.

BRIEF DESCRIPTION OF THE DRAWINGS

The present invention will be explained in more detail be-low with reference to the exemplary embodiments specified in the schematic figures of the drawings, in which.

Figure 1:
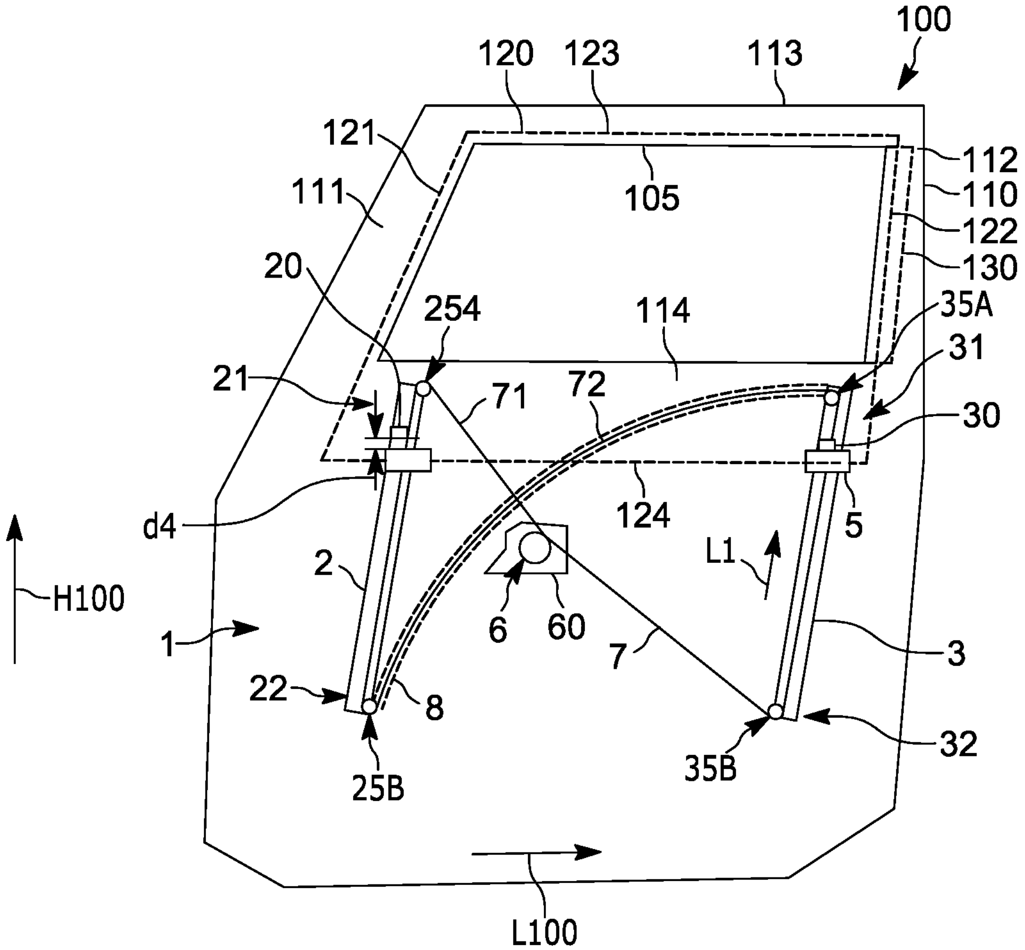
FIG. 1 shows a schematic illustration of a motor vehicle door according to an exemplary embodiment of the present invention.

The accompanying drawings are intended to convey further understanding of the embodiments of the invention. They illustrate embodiments and, in conjunction with the description, serve for the explanation of principles and concepts of the invention. Other embodiments and many of the stated advantages will become apparent with regard to the drawings. The elements of the drawings are not necessarily shown in a manner true to scale with respect to one another.

In the figures of the drawing, identical, functionally identical and identically acting elements, features and components are denoted in each case by the same reference signs unless stated otherwise.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Window regulator systems are therefore often constructed such that a pulling force for moving the window pane into the closed position is applied via a cable, which is driven directly by a cable drive, to a rear slider which is guided on a guide rail arranged in the region of the rear strut. A front slider, which is guided on a guide rail arranged in the region of the front strut, is coupled to the rear slider by means of the cable in order to apply a pulling force. Such a system is described for example in the German utility model DE 20 2008 016 221 U1.

EP 1 778 942 B1 describes applying the pulling force from the cable drive to the slider arranged on the front strut.

In order to ensure a defined position of the sliders in the closed position of the window pane, stops may be pro-vided on the guide rails. DE 10 2009 033 466 A1 describes a window regulator system with a slider which has an adjustable section in order to achieve a parallel alignment of sliders along guide rails. For the calibration of the system, the sliders are brought into contact with the stops in succession.

Since window regulator systems in motor vehicle doors are often exposed to high temperature fluctuations and, furthermore, high forces act on the cable drive during the movement of the window pane, cable sagging or similar phenomena can occur over the course of time, which impair the positionability of the sliders or drivers on the respective guide rail. This can have the result that the sliders can no longer be moved as far as the stops, and thus the window pane is no longer reliably brought into the closed position.

FIG. 1 shows, by way of example and schematically, a motor vehicle door 100 for a motor vehicle (not illustrated here). The motor vehicle door 100 may for example be provided as a driver's door or front passenger door for an automobile. The motor vehicle door 100 has a frame 110, a window pane 120, an optional guide structure 130 and a window regulator system 1.

As is illustrated schematically in FIG. 1, the frame 100 has a first strut 111, a second strut 112, an optional connecting strut 113 and an optional base region 114. The first and the second strut 111, 112 are arranged at a distance from one another in relation to a door longitudinal direction L100 and are arranged in a positionally fixed manner relative to one another. The first strut 111 runs obliquely or at an angle relative to the second strut 112. The connecting strut 113 extends along the door longitudinal direction L100 and connects the first and the second strut 111, 112 in an upper end region. The base section 114 is arranged at a distance from the connecting strut 113 in relation to a door vertical direction H100 extending transversely to the door longitudinal direction L100, and connects the first and the second strut 111, 112 in a lower end region that is situated opposite the upper end region. The first strut 111, the second strut 112, the connecting strut 113 and the base region 114 jointly de-fine a window opening 105. As can be seen in FIG. 1, the window opening 105 is delimited in relation to the door longitudinal direction L100 by a first strut 111 and the second strut 112 and in relation to the door vertical direction H100 by the base section 114 and the connecting strut 113. The window opening 105 may have a polygonal periphery, as is illustrated by way of example in FIG. 1.

The optional guide structure 130 is illustrated merely symbolically in FIG. 1 as a dash-dotted line. As can be seen in FIG. 1, the guide structure 130 is arranged on the second strut 112 and may be implemented by two lips (not illustrated) which extend along the second strut 112 and which define a guide slot. The lips may for example be produced from an elastically deformable material such as, for example, a foam or the like.

The window regulator system 1 is used to move the window pane 120 along the door vertical direction H100 and will be discussed in more detail below.

The window pane 120 has an area sufficient to completely cover the window opening 105 of the frame 110. As an example, the window pane 120 may have a front edge 121 facing toward the first strut 111, a rear edge 122 facing toward the second strut 112, a top edge 123 which connects the front edge 121 and the rear edge 122 and which faces toward the connecting strut 113, and a bottom edge 124 which is situated opposite the top edge 123 in relation to the door vertical direction H100 and which likewise ex-tends between the front edge 121 and the rear edge 122, as illustrated by way of example in FIG. 1. As is illustrated schematically in FIG. 1, the front edge 121 runs obliquely or at an angle relative to the rear edge 122.

In FIG. 1, the window pane 120 is illustrated symbolically as a dashed line, wherein FIG. 1 shows the arrangement of the pane 120 in a closed setting or closed position. In the closed position, the window pane 120 covers the window opening 105, such as completely. In an open position (not illustrated), the window pane 120 at least partially opens up the window opening 105. In the open position, the top edge 123 of the window pane 120 is arranged at a distance from the connecting strut 113 in relation to the vertical direction H100, or a distance be-tween the top edge 123 of the window pane 120 and the base section 114 is reduced in relation to the closed position. For the movement of the window pane 120 between the open and the closed position, the window pane 120 is coupled to the window regulator system 1, for example at the bottom edge 124.

The rear edge 122 of the window pane 120 is guided along the second strut 112. As an example, the rear edge 122 of the window pane 120 may be guided in the guide structure 130, for example by virtue of the rear edge 122 being guided in the slot formed between the lips. Optionally, the rear edge 122 is guided in the guide structure 130 along an entire adjustment travel by which the window pane 120 is moved during the movement between the open and the closed position.

Figure 2:
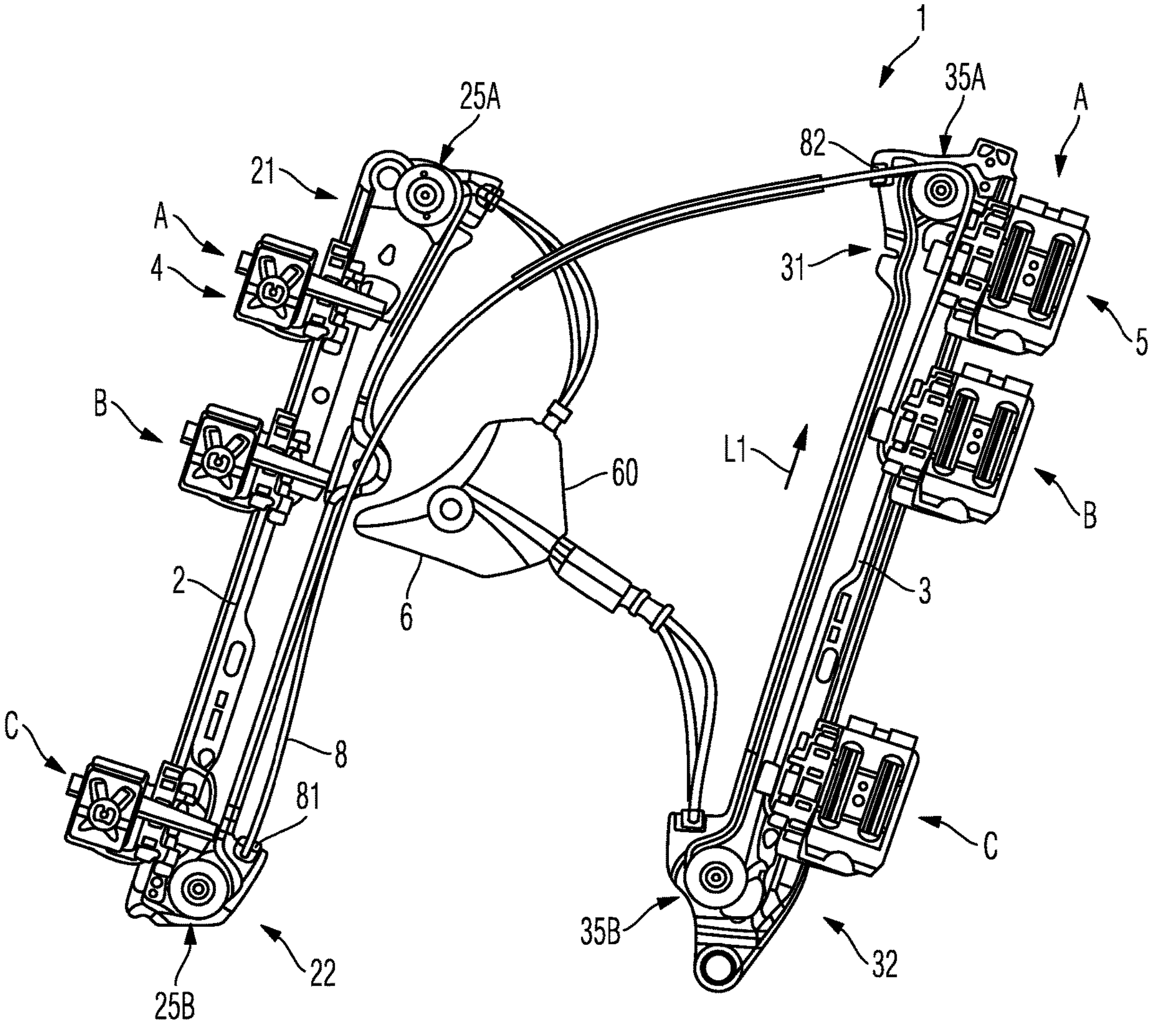
FIG. 2 shows a window regulator system according to an exemplary embodiment of the present invention.

As illustrated schematically in FIG. 1, the window regulator system 1 has a first guide rail 2, a second guide rail 3, a first slider 4 guided on the first guide rail 2, a second slider 5 guided on the second guide rail 3, a cable drum 6, a drive cable 7 and a Bowden cable sheath 8, which is illustrated merely symbolically in FIG. 1. FIG. 2 shows a window regulator system 1 independently of the motor vehicle door 100.

As can be seen in FIG. 2, the guide rails 2, 3 may be implemented as profile rails which each extend in a rail longitudinal direction L1. The guide rails 2, 3 each define a guide track extending in the rail longitudinal direction L1. The guide track may be defined in each case by a lateral profile section 23, 33 of the respective guide rail 2, 3, which lateral profile section may for example have an arcuate or L-shaped cross section as illustrated by way of example in FIGS. 3 and 4. The guide rails 2, 3 may be produced from a metal material such as, for example, an aluminum alloy.

Figure 3:
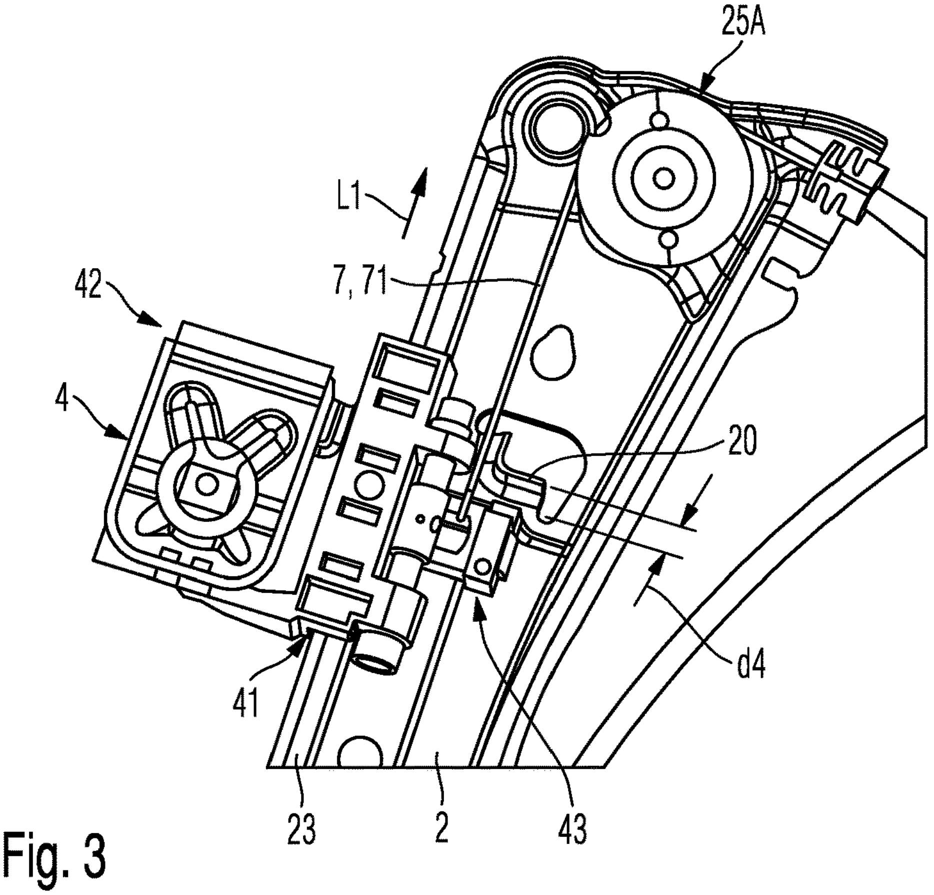
FIG. 3 shows a detail view of the window regulator system illustrated in FIG. 2 in the region of an upper end region of a first guide rail.

As is illustrated symbolically in FIG. 1, the first guide rail 2 has a first stop 20. The first stop 20 is arranged in a first, upper end region 21 of the first guide rail 2 in relation to the rail longitudinal direction L1. FIG. 3 shows, by way of example, a detail view of the upper end region 21 of the first guide rail 2. As can be seen in FIG. 3, the first stop 20 may for example be implemented as an L-shaped formation of the first guide rail 2. In general, the first stop 20 may be formed as a single piece with the first guide rail 2.

Figure 4:
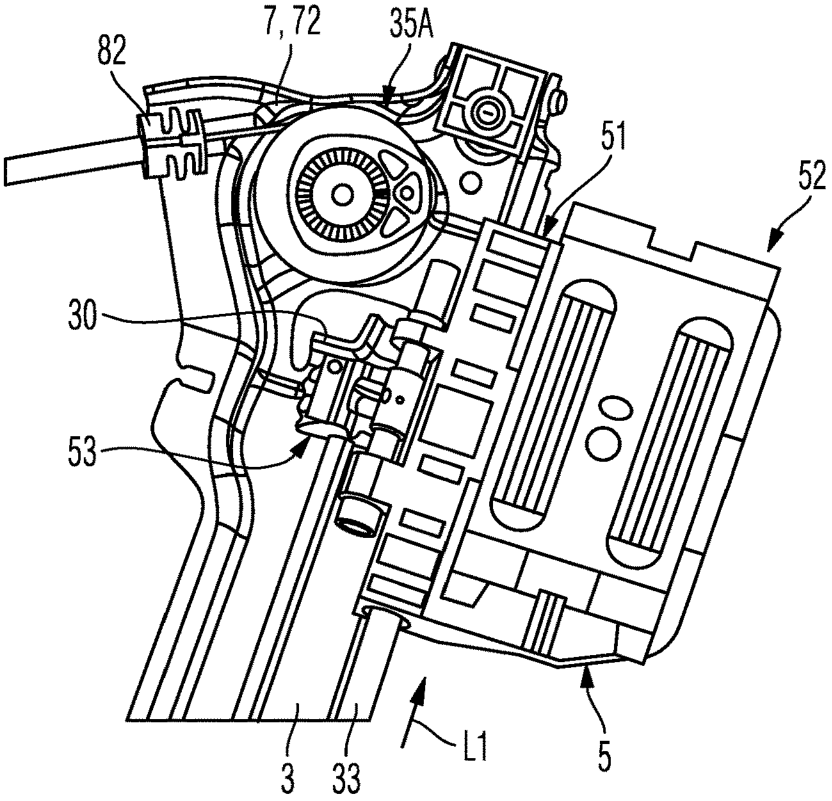
FIG. 4 shows a detail view of the window regulator system illustrated in FIG. 2 in the region of an upper end region of a second guide rail.

As is furthermore illustrated symbolically in FIG. 1, the second guide rail 3 has a second stop 30. The second stop 30 is arranged in a first, upper end region 31 of the second guide rail 3 in relation to the rail longitudinal direction L1. FIG. 4 shows, by way of example, a detail view of the upper end region 31 of the second guide rail 3. As can be seen in FIG. 4, the second stop 30 may for example be implemented as an L-shaped formation of the second guide rail 3. In general, the second stop 30 may be formed as a single piece with the second guide rail 3.

The first slider 4 is guided on the first guide rail 2 along the rail longitudinal direction L1. As is shown by way of example in FIG. 3, the first slider 4 may have a guide section 41 which engages with the guide rail 2, such as with the profile section 23. Furthermore, a coupling section 42 for coupling the window pane 120 to the first slider 4 and a pulling section 43 for coupling the drive cable 7 to the first slider 4 may be provided, as is illustrated by way of example in FIG. 3.

The second slider 5 is guided on the second guide rail 3 along the rail longitudinal direction L1. As is shown by way of example in FIG. 4, the second slider 4 may have a guide section 51 which engages with the guide rail 3, such as with the profile section 33. Furthermore, a coupling section 52 for coupling the window pane 120 to the second slider 5 and a pulling section 53 for coupling the drive cable 7 to the second slider 5 may be provided, as is illustrated by way of example in FIG. 4.

As is generally illustrated in FIG. 2, the first and second guide rails 2, 3 are arranged at a distance from one another, wherein the guide track of the first guide rail 2 and the guide track of the second guide rail 3 preferably extend parallel to one another. In the case of the installation of the window regulator system 1 in a motor vehicle door 100 as illustrated by way of example in FIG. 1, the first guide rail 2 is arranged in the region of the first strut 111 and the second guide rail 3 is arranged in the region of the second strut 112. The guide rails 2, 3 furthermore extend along the door longitudinal direction L100, wherein the first or upper end region 21 of the first guide rail 2 and the first or upper end region 31 of the second guide rail 3 are in each case situated so as to face toward the window opening 105. The second guide rail 3 and the guide structure 130 preferably extend parallel to one another. In general, the guide rails 2, 3 are arranged in a positionally fixed manner relative to the window opening 105 or relative to the frame 110.

As is furthermore schematically illustrated in FIG. 1, the window pane 120 is coupled to the sliders 4, 5. As an example, the bottom edge 124 of the window pane 120 may be held in the coupling structure 42, 52 of the respective slider 4, 5.

The cable drum 6 is mounted so as to be rotatable about an axis of rotation. The cable drum 6 may for example be mounted rotatably on a foundation or base plate 60, as illustrated by way of example and schematically in FIGS. 1 and 2. The base plate 60 or, in general, the axis of rotation of the cable drum 6 is arranged in a positionally fixed manner relative to the guide rails 2, 3. For the rotation of the cable drum 6, it is for example possible for an electric motor (not illustrated) to be provided as a drive device. It is however alternatively also conceivable for an actuating lever (not illustrated) for manual actuation of the cable drum 6 to be provided as a drive device.

The drive cable 7 is coupled to both the first slider 4 and to the second slider 5. This is illustrated in detail in FIGS. 3 and 4. For example, a first cable section 71 of the drive cable 7 may be attached to the pulling section 43 of the first slider 4 and a second cable section 72 of the drive cable 7 may be attached to the pulling section 53 of the second slider 5. Furthermore, the drive cable 7 is coupled to the cable drum 6 and can thus be driven by the cable drum 6. For example, it may be provided that the cable 7 loops around the cable drum 6 one or more times and/or that the cable 7 is fastened to the cable drum 6 by means of a clamping device (not illustrated).

One possible cable guidance configuration of the drive cable 7 is illustrated by way of example in FIGS. 1 and 2. As an example, it may be provided that the first cable section 71 is guided to the cable drum 6 via an upper first cable deflector 25A arranged in the upper end region 21 of the first guide rail 2. From the cable drum 6, to which the first cable section 71 is coupled, said first cable section is guided via a lower second cable deflector 35B arranged in a second, lower end region 32 of the second guide rail 3 to the second slider 5, to which the first cable section 71 is likewise fastened. The second, lower end region 32 of the second guide rail 3 is situated opposite the first, upper end section 31 of the second guide rail 3 in relation to the rail longitudinal direction L1.

The second cable section 72 of the drive cable 7 is guided to the first slider 4 via an upper second cable deflector 35A arranged in the upper end region 31 of the second guide rail 3 and via a lower first cable deflector 25B arranged in a second, lower end region 22 of the first guide rail 2, and is coupled to the first slider 4. The second, lower end region 22 of the first guide rail 2 is situated opposite the first, upper end region 21 of the first guide rail 2 in relation to the rail longitudinal direction L1.

As can be seen in FIG. 2, the cable deflectors 25A, 25B, 35A, 35B may each be designed as deflecting pulleys. The deflecting pulleys are each mounted on the respective guide rail 2, 3 so as to be rotatable about an axis of rotation.

As a result of rotation of the cable drum 6, one of the cable sections 71, 72 is shortened and the respective other cable section 72, 71 is lengthened. For the movement of the sliders 4, 5 in the direction of the stop, a pulling force is exerted on the first slider 4 by the first cable section 71. As a result of the coupling of the second cable section 72 to the first slider 4, this pulling force is, owing to the cable guidance via the cable deflectors 25B, 35A, transmitted to the second slider 5 as a pulling force acting in the direction of the second stop 30. As a result, a pulling force is exerted on both sliders 4, 5 and the window pane 120 is moved along the guide rails 2, 3. In general, the drive cable is thus guided such that a pulling force acting in the direction of the first stop 20 can be applied directly to the first slider 4 by means of the cable drum 6 via the first cable section 71, and the pulling force is, at least partially, transmitted via the second cable section 72 to the second slider 5 as a pulling force acting in the direction of the second stop 30.

As is illustrated symbolically in FIG. 1 and in detail in FIG. 2, the second cable section 71 is guided in a Bowden cable sheath 8 between the upper end region 31 of the second guide rail 3 and the lower end region 22 of the first guide rail 2. As can be seen in FIG. 2, the Bowden cable sheath 8 extends in arcuate fashion between the upper end region 31 of the second guide rail 3 and the lower end region 22 of the first guide rail 2. The Bowden cable sheath 8 may be provided with end sleeves 81, 82, wherein a first end sleeve 81 is fastened, for example screwed, to the first guide rail 2 and a second end sleeve 82 is fastened, for example screwed, to the second guide rail 3. A length of the Bowden cable sheath 8 is, owing to the arcuate course, longer than a shortest distance be-tween the fastening points of the end sleeves 81, 82 on the respective guide rail 2, 3. A length of the Bowden cable sheath 8 is thus measured in a stretched or unwound state of the Bowden cable sheath 8. For example, in FIG. 2, the length of the Bowden cable sheath 8 corresponds to the length of the arc between the end sleeves 81, 82. The Bowden cable sheath 8 may be formed from one or more plastic materials.

In FIG. 2, three possible positions A, B, C of the sliders 4, 5 are illustrated by way of example, into which positions the sliders 4, 5 are movable along the guide rails 2, 3 by the drive cable 7. Position A shows a stop position of the sliders 4, 5, which is also illustrated in FIGS. 1, 3 and 4. Position B shows an intermediate position and position C shows a lower end position of the sliders 4, 5.

In the stop position A, the sliders 4, 5 are arranged in the upper end region 21, 31 of the respective guide rail 2, 3 in relation to the rail longitudinal direction L1. As can be seen in FIGS. 1, 3 and 4, in the stop position A, the second slider 5 lies against the second stop 30 and the first slider 4 is arranged at a predetermined distance d4 from the first stop 20. When the sliders 4, 5 are arranged in the stop position A, the window pane 120 is situated in the closed position, as is illustrated schematically in FIG. 1. As illustrated by way of example in FIGS. 3 and 4, the pulling section 43, 53 of the respective slider 4, 5 may in each case be provided to lie against the respective stop 20, 30. As illustrated in FIG. 3, the pulling section 43 of the first slider 4 is arranged at a distance from the first stop in relation to the rail longitudinal direction L1 in the stop position A. FIG. 4 also shows that the second slider 5 lies with the pulling piece 53 against the second stop 30 in the stop position.

In the lower end position C, the sliders 4, 5 are arranged in the lower end region 22, 32 of the respective guide rail 2, 3 in relation to the rail longitudinal direction L1, as illustrated by way of example in FIG. 2. For ex-ample, in each case one lower stop (not illustrated) may additionally be provided on the respective guide rails 2, 3, wherein at least one of the sliders 4, 5 lies against the respective lower stop in the lower end position C. When the sliders 4, 5 are arranged in the lower end position C, the window pane 120 is situated in an open position.

In the intermediate position B, the sliders 4, 5 are arranged between the lower end region 22, 32 and the upper end region 21, 31 of the respective guide rail 2, 3 in relation to the rail longitudinal direction L1, as illustrated by way of example in FIG. 2. When the sliders 4, 5 are arranged in the intermediate position B, it is likewise the case that the window pane 120 is situated in an open position.

As already discussed, the first slider 4 is arranged in the stop position A at a predetermined distance d4 from the first stop 20, as illustrated in FIGS. 1 and 3. This spacing ensures that the pulling force exerted on the first slider 4 is reliably transmitted to the second slider 5 by the second cable section 72 when the window pane 120 is moved into the closed position, as has been explained above. The distance d4 is preferably selected so as to lie in a range between 0.4 percent and 1.2 percent of the length of the Bowden cable sheath 8. This ratio may be advantageous because, in this range, it is ensured that, even in the case of sagging of long Bowden cable sheaths 8, an abutment of the first slider 4 against the first stop is reliably prevented.

As an example, the predetermined distance d4 may be greater than 3 mm and less than or equal to 8 mm and preferably less than or equal to 6 mm. In the event of a change in length of the Bowden cable sheath 8, the first slider 4 is, in the stop position A, situated closer to the first stop 4 than was intended in the original design state. This leads to tilting of the window pane 120, because the sliders 4, 5 are no longer, in relation to the door vertical direction H100, arranged at the level intended according to the design. In the distance window mentioned above, it is possible on the one hand for a large range of changes in length of the Bowden cable sheath 8 to be compensated to for long Bowden cable sheaths 8, wherein the resulting pane tilt is limited to a tolerable value.

Although the present invention has been described completely above on the basis of preferred exemplary embodiments, it is not restricted thereto but may be modified in a variety of ways.

With regard to directional indications and axes, in particular directional indications and axes that relate to the course of physical structures, a course of one axis, one direction or one structure "along" another axis, direction or structure is to be understood here to mean that these, in particular the tangents resulting at a respective point of the structures, run in each case at an angle of less than 45 degrees, preferably less than 30 degrees, and particularly preferably parallel, with respect to one another.

With regard to directional indications and axes, in particular directional indications and axes that relate to the course of physical structures, a course of one axis, one direction or one structure "transversely" with respect to another axis, direction or structure is to be under-stood here to mean that these, in particular the tangents resulting at a respective point of the structures, run in each case at an angle of greater than or equal to 45 degrees, preferably greater than or equal to 60 degrees, and may be perpendicular, with respect to one another.

Here, components of "single-piece", "single-part" or "integral" form or formed "as a single piece" are generally to be understood to mean that these components are present as a single part forming a material unit and in particular are produced as such, wherein one component cannot be detached from the other without breaking the material cohesion.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

1 Window regulator system
2 First guide rail
3 Second guide rail
4 First slider
5 Second slider
6 Cable drum
7 Drive cable
8 Bowden cable sheath
20 First stop
21 Upper end region of the first guide rail
22 Lower end region of the first guide rail
23 Profile section
25A Upper first cable deflector
25B Lower first cable deflector
30 Second stop
31 Upper end region of the second guide rail
32 Lower end region of the second guide rail
33 Profile section
35A Upper second cable deflector
35B Lower second cable deflector
41 Guide section of the first slider
42 Coupling section of the first slider
43 Pulling section of the first slider
51 Guide section of the second slider
52 Coupling section of the second slider

53 Pulling section of the second slider
71 First cable section of the drive cable
72 Second cable section of the drive cable
81 First end sleeve
82 Second end sleeve
100 (Motor vehicle) door
105 Window opening
110 Frame
111 First strut
112 Second strut
113 Connecting strut
120 Window pane
121 Front edge of the window pane
122 Rear edge of the window pane
123 Top edge
124 Bottom edge
130 Guide structure
A Stop position
B Intermediate position
C Lower end position
d4 Distance
L1 Rail longitudinal direction
L100 Door longitudinal direction
H100 Door vertical direction

The invention claimed is:

1. A window regulator system for use in a motor vehicle, the window regulator system comprising:

a first guide rail provided with a first upper end region including a first stop wherein the first stop is spaced apart from ends of the first guide rail;

a second guide rail provided with a second upper end region and including a second stop, wherein the second stop is spaced apart from ends of the second guide rail;

a first slider configured to be guided on the first guide rail and configured as a single-part to be movable solely as a whole between an upper end position and a lower end position;

a second slider configured to be guided on the second guide rail and configured as a single-part to be movable solely as a whole between the upper end position and the lower end position;

a cable drum; and a drive cable configured to be driven by means of the cable drum, coupled to the first and second sliders, and guided between the second upper end region of the second guide rail and a lower end region of the first guide rail in a Bowden cable sheath;

an upper first cable deflector disposed in the upper end region of the first guide rail;

a lower second cable deflector disposed a lower end region of the second guide rail, wherein a first cable section of the drive cable is coupled to the first slider and the upper first cable deflector is configured to guide the first cable section to the cable drum and the lower second cable deflector is configured to guide the drive cable from the cable drum to the second slider;

an upper second cable deflector disposed in the upper end region of the second guide rail; and a lower first cable deflector arranged in a lower end region of the first guide rail, wherein a second cable section is coupled to the second slider and the upper second cable deflector is configured to guide the second cable section to the second slider and the lower first cable deflector guides the second cable section to the first slider, wherein the drive cable is configured to move the first and second sliders along the guide rails between the upper end position and the lower end position, into a stop position, wherein the second slider lies in the upper end position against the second stop and the first slider is spaced apart from the first stop by a predetermined distance in the upper end position, and wherein the predetermined distance ranges between 0.4 percent and 1.2 percent of a length of the Bowden cable sheath.

2. The window regulator system of claim 1, wherein the predetermined distance is greater than 3 mm and less than or equal to 8 mm.

3. The window regulator system of claim 2, wherein the predetermined distance is greater than 3 mm and less than or equal to 6 mm.

4. The window regulator system of claim 1, wherein the first stop is formed as a single piece with the first guide rail and/or the second stop is formed as a single piece with the second guide rail.

5. The window regulator system of claim 1, wherein one or more of the upper first cable deflector and the lower second cable deflector are deflecting pulleys.

6. A motor vehicle door comprising:

a frame defining a window opening delimited with respect to a longitudinal-direction of the motor vehicle door by a first strut and a second strut spaced apart from the first strut;

a window regulator system including, a first guide rail provided with a first upper end region including a first stop, wherein the first stop is spaced apart from ends of the first guide rail, a second guide rail provided with a second upper end region and including a second stop, wherein the second stop is spaced apart from ends of the second guide rail, wherein the first guide rail is disposed closer to the first strut than the second strut and the second guide rail is disposed closer to the second strut than the first strut, a first slider configured to be guided on the first guide rail and configured as a single-part to be movable solely as a whole between an upper end position (A) and a lower end position (C), a second slider configured to be guided on the second guide rail and configured as a single-part to be movable solely as a whole between the upper end position (A) and the lower end position (C), a cable drum, and a drive cable configured to be driven by means of the cable drum, coupled to the first and second sliders, and guided between the second upper end region of the second guide rail and a lower end region of the first guide rail in a Bowden cable sheath, an upper first cable deflector disposed in the upper end region of the first guide rail, a lower second cable deflector disposed a lower end region of the second guide rail, wherein a first cable section of the drive cable is coupled to the first slider and the upper first cable deflector is configured to guide the first cable section to the cable drum and the lower second cable deflector is configured to guide the drive cable from the cable drum to the second slider, an upper second cable deflector disposed in the upper end region of the second guide rail, and a lower first cable deflector arranged in a lower end region of the first guide rail, wherein a second cable section is coupled to the second slider and the upper second cable deflector is configured to guide the second cable section to the second slider and the lower first cable deflector guides the second cable section to the first slider;

wherein the drive cable is configured to move the first and second sliders along the guide rails between the upper end position (A) and the lower end position (C), wherein the second slider lies in the upper end position (A) against the second stop and the first slider is spaced apart from the first stop by a predetermined distance in the upper end position (A), and wherein the predetermined distance ranges between 0.4 percent and 1.2 percent of a length of the Bowden cable sheath; and a window pane coupled to the first slider and the second slider and including a rear edge and a front edge obliquely extending with respect to the rear edge, wherein the second strut is configured to guide the rear edge as the first and second sliders move the window pane to a closed position, in which the window pane covers the window opening and the sliders are in the upper end position (A).

7. The motor vehicle door of claim 6, wherein the rear edge of the window pane is guided by a guide structure disposed along the second strut.

8. The motor vehicle door of claim 7, wherein the guide structure extends in a direction parallel to the second guide rail.

9. A window regulator for use in a motor vehicle, the window regulator comprising:

a first guide rail including a first stop, wherein the first stop is spaced apart from ends of the first guide rail;

a second guide rail spaced apart from the first guide rail and including a second stop, wherein the second stop is spaced apart from ends of the second guide rail;

a cable drum;

a cable assembly including a Bowden cable sheath and a cable extending through the Bowden cable sheath, and the cable drum is configured to wind the cable;

a first slider configured to be guided on the first guide rail and configured as a single-part to be movable solely as a whole between an upper end position (A) and a lower end position (C);

a second slider configured to be guided on the second guide rail and configured as a single-part to be movable solely as a whole between the upper end position (A) and the lower end position (C), wherein winding the cable about the cable drum translates the first slider and the second slider along the first guide rail and the second guide rail towards the first stop and the second stop, respectively, to carry a window pane towards a closed position, in which the first slider is spaced apart from the first stop by a predetermined distance in the upper end position (A), based on a length of the Bowden cable sheath, and the second slider lies against the second stop in the upper end position (A), an upper first cable deflector is disposed in an upper end region of the first guide rail;

a lower second cable deflector disposed a lower end region of the second guide rail, wherein a first cable section of the cable is coupled to the first slider and the upper first cable deflector is configured to guide the cable section to the cable drum and the lower second cable deflector is configured to guide the drive cable from the cable drum to the second slider;

an upper second cable deflector disposed in an upper end region of the second guide rail; and a lower first cable deflector arranged in a lower end region of the first guide rail, wherein a second cable section is coupled to the second slider and the upper second cable deflector is configured to guide the second cable section to the second slider and the lower first cable deflector guides the second cable section to the first slider.

10. The window regulator of claim 9, wherein the predetermined distance ranges between 0.4 percent and 1.2 percent of the length of the Bowden cable sheath.

11. The window regulator of claim 10, wherein the predetermined distance is greater than 3 mm and less than or equal to 6 mm.

12. The window regulator of claim 9, wherein the length of the Bowden cable sheath is greater than 600 mm.

13. The window regulator of claim 9, wherein at least one of the first stop or the second stop is integrally formed with the first guide rail or the second guide rail, respectively.

14. A vehicle door comprising:

a frame including a first strut, forming a front edge of a window opening, and a second strut forming a rear edge of the window opening;

a first guide rail including a first stop, wherein the first stop is spaced apart from ends of the first guide rail;

a second guide rail spaced apart from the first guide rail and including a second stop, wherein the second stop is spaced apart from ends of the second guide rail, wherein the first guide rail is disposed closer to the first strut than the second strut and the second guide rail is disposed closer to the second strut than the first strut;

a cable drum;

a cable assembly including a Bowden cable sheath and a cable extending through the Bowden cable sheath, and the cable drum is configured to wind the cable;

a first slider configured to be guided on the first guide rail and configured as a single-part to be movable solely as a whole between an upper end position (A) and a lower end position (C);

a second slider configured to be guided on the second guide rail and configured as a single-part to be movable solely as a whole between the upper end position (A) and the lower end position (C);

a window pane carried by the first slider and the second slider wherein winding the cable about the cable drum translates the first slider and the second slider along the first guide rail and the second guide rail between the upper end position (A) and the lower end position (C) and towards the first stop and the second stop, respectively, to move the window pane towards a closed position, in which the first slider is spaced apart from the first stop at the upper end position (A) by a predetermined distance, based on a length of the Bowden cable sheath, and the second slider lies against the second stop at the upper end position (A);

an upper first cable deflector disposed in an upper end region of the first guide rail;

a lower second cable deflector disposed a lower end region of the second guide rail, wherein a first cable section of the cable is coupled to the first slider and the upper first cable deflector is configured to guide the cable section to the cable drum and the lower second cable deflector is configured to guide the drive cable from the cable drum to the second slider;

an upper second cable deflector disposed in an upper end region of the second guide rail; and a lower first cable deflector arranged in a lower end region of the first guide rail, wherein a second cable section is coupled to the second slider and the upper second cable deflector is configured to guide the second cable section to the second slider and the lower first cable deflector guides the second cable section to the first slider.

15. The vehicle door of claim 14, wherein the window pane includes a rear edge and the second strut is configured to guide the rear edge.

16. The vehicle door of claim 14, wherein the first stop is formed integrally with an upper end portion of the first guide rail.

17. The vehicle door of claim 14, wherein the length of the Bowden cable sheath is greater than or equal to 700 mm.

18. The vehicle door of claim 17, wherein the predetermined distance ranges between 0.4 percent and 1.2 percent of the length of the Bowden cable sheath.

* * * * *